Patented Dec. 11, 1923.

1,477,076

UNITED STATES PATENT OFFICE.

EMIL PIRON, OF NEW YORK, N. Y., ASSIGNOR TO PIRON COAL DISTILLATION SYSTEMS, INC., OF NEW YORK, N. Y., A CORPORATION OF DELAWARE.

PROCESS FOR SEPARATING ORGANIC ACIDS FROM AQUEOUS SOLUTIONS THEREOF.

No Drawing.   Application filed October 31, 1922.   Serial No. 598,211.

*To all whom it may concern:*

Be it known that I, EMIL PIRON, a subject of the King of the Belgians, residing at New York city, in the county of New York and State of New York, have invented certain new and useful Improvements in Processes for Separating Organic Acids from Aqueous Solutions Thereof, of which the following is a specification.

In certain commercial processes, mixtures of volatile organic acids and water are obtained, in which the two liquids are soluble in each other in substantially all proportions. When the rectification of such aqueous solution is attempted, concentration of the acid may be obtained only after repeated distillings, because such a large proportion of the acid is carried over in the vapor into the distillate. This is particularly true when the vapor pressure of the acid is near to and higher than that of water.

To reduce the percentage of acid carried over in the water vapor in the distilling process, it has been proposed to add some neutral substance to the mixture which will reduce the effective vapor pressure of the acid. This third component is usually one which is miscible with the acid, but not with the water, and which preferably has a vapor pressure near that of the acid in the solution. After distillation, whatever quantity of the third component is carried over in the distillate, is separated therefrom by decantation and is available for reuse.

Examples of substances which have been used in this manner are—xylol, petroleum distillates and chlor-benzol, and in general such substances may be selected from the following according to the acid to be concentrated: hydrocarbons of the methane, methylene, acetylene and aromatic groups, nitrogen and halogen compounds of these bodies, including carbon tetrachloride, or any of the ethers or esters.

The action of these added materials may be described as producing an attraction or affinity for the acid component, whereby the effective vapor tension thereof is decreased.

In adopting this procedure for the concentration of dilute aqueous solutions of the volatile acids, it has been found that the beneficial effect of the third component is much diminished, or will be practically nil, at low concentrations of such volatile acids. It is an object of the present invention, therefore, to provide a method of procedure for efficiently concentrating solutions of volatile acids at very dilute concentration.

More specifically, the invention resides in adding a fourth component to the solution, which will have the effect of further reducing the effective vapor tension of the volatile acids. In general, this fourth component will be one which mixes with or has a greater affinity for the third component (which latter may be toluol, for example,) than the volatile acids have for the third component. More specifically, the fourth component may be a fatty acid having a heavier hydrocarbon radical than acetic acid.

The following is a preferred example of carrying out the improved method: To a dilute solution of volatile acids, such, for example, as the so-called "green liquor" from the destructive distillation of wood, from which it is desired to concentrate acetic acid, is added approximately 20 percent of tailings containing approximately 50% of butyric acid (based on the weight of acetic acid present in the liquor) and, during distillation, the still is fed continuously with a stream of toluol at such a rate that the vapor will contain approximately 50% of toluol and 50% of water. The total quantity of the added toluol will be carried over in the distillate. The ratio between the proportion of the volatile acid in the distillate and in the liquor in the still is smaller than it would be without the use of toluol and butyric acid and the rate of concentration of the acid in the residue of the still is larger. The toluol may be separated from the distillate by decantation. The concentrated solution of the acetic acid and the remaining quantities of butyric acid, are then separated according to the usual methods of fractional distillation.

In practice, it has been found that the addition of a slight quantity of a substance meeting the requirements of a third component as has been outlined, but having a somewhat higher boiling point, such as cresol, is useful in aiding the action of the toluol or equivalent third component.

While butyric acid has been mentioned in the preferred example, it is to be understood that the invention is not limited thereto, as the use of other analogous substances will occur to those skilled in the art.

I claim:

1. In a process of concentrating solutions comprising a water component and a volatile acids component, in which a third component is added to reduce the effective vapor pressure of the volatile acids component, the steps which consist in adding a fourth component to reduce further the effective vapor pressure of the volatile acids component and concentrating the solution.

2. In a process of concentrating solutions comprising a water component and a volatile acids component, in which a third component is added to reduce the effective vapor pressure of the volatile acids component, the steps which consists in adding a fatty acid having a higher boiling point than the said volatile acids component to reduce further the effective vapor pressure of the said volatile acids component, and concentrating the solution.

3. In a process of concentrating solutions comprising a water component and a volatile acids component, in which a third component is added to reduce the effective vapor pressure of the volatile acids component, the steps which consist in adding butyric acid, and concentrating the solution.

4. In a process of concentrating solutions comprising a water component and a volatile acids component, in which a third component is added which is miscible with the acid and not miscible with the water and which has a vapor pressure at or near that of the acid, the steps which consist in adding a fourth component which has a greater affinity for the third component than the volatile acid has for the third component, and concentrating the mixture.

5. A method of concentrating dilute aqueous solutions of volatile organic acids which comprises adding approximately 10% of butyric acid, based on the weight of the volatile acid present in solution, and distilling and during distillation, adding toluol to the still in sufficient quantities to approximately equal the weight of the aqueous part of the distillate.

6. A method of concentrating dilute aqueous solutions of volatile organic acids which comprises adding approximately 10% of butyric acid, based on the weight of the volatile acid present in solution, and a small percentage of cresol, and distilling, and during distillation, adding toluol to the still in sufficient quantity to approximately equal the weight of the aqueous part of the distillate.

7. The process of concentrating an aqueous solution of a volatile acid which consists in adding to the solution a third component which is miscible with the acid and not miscible with the water and which has a vapor pressure at or near that of the acid, and also adding as a fourth component, a fatty acid having a higher boiling point than the acid and distilling the mixture.

8. The process of concentrating an aqueous solution of a volatile organic acid, which consists in adding to the solution a third component which is miscible with the acid and not miscible with the water and which has a vapor pressure at or near that of the acid, and also in adding as a fourth component butyric acid, and distilling the mixture.

9. A method of concentrating dilute aqueous solutions of volatile organic acids which comprising adding thereto toluol and butyric acid, and concentrating the mixture.

10. A method of concentrating dilute aqueous solutions of volatile organic acids which comprises adding thereto toluol, cresol and butyric acid, and concentrating the mixture.

11. A method of concentrating a dilute aqueous solution of acetic acid which comprises adding thereto a third component, which is miscible with the acid and not miscible with the water and which has a vapor pressure at or near that of the acid, and a fourth component, which has a greater affinity for the third component than the acetic acid has for the third component, and then distilling the mixture.

EMIL PIRON.